United States Patent Office 2,906,098
Patented Sept. 29, 1959

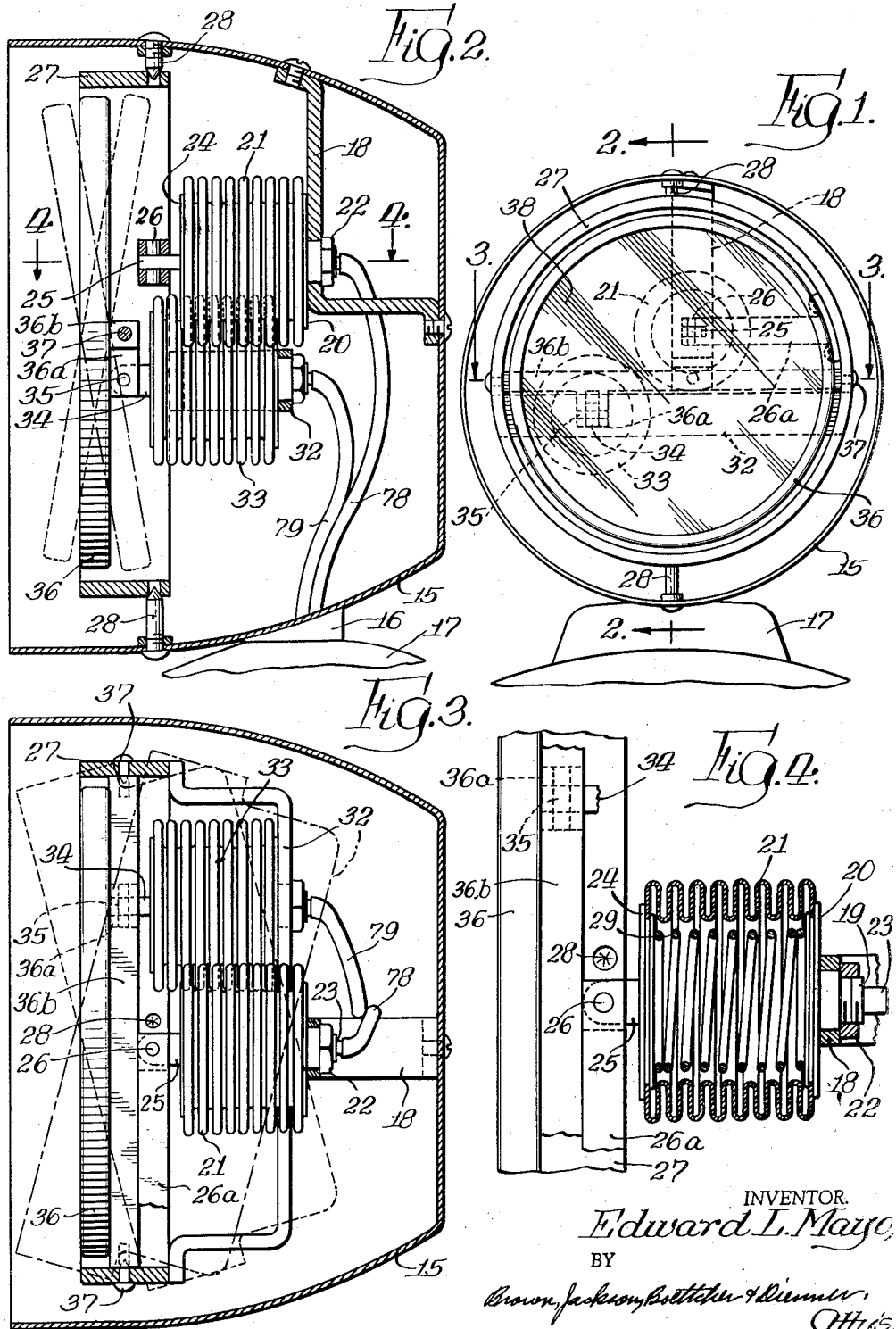

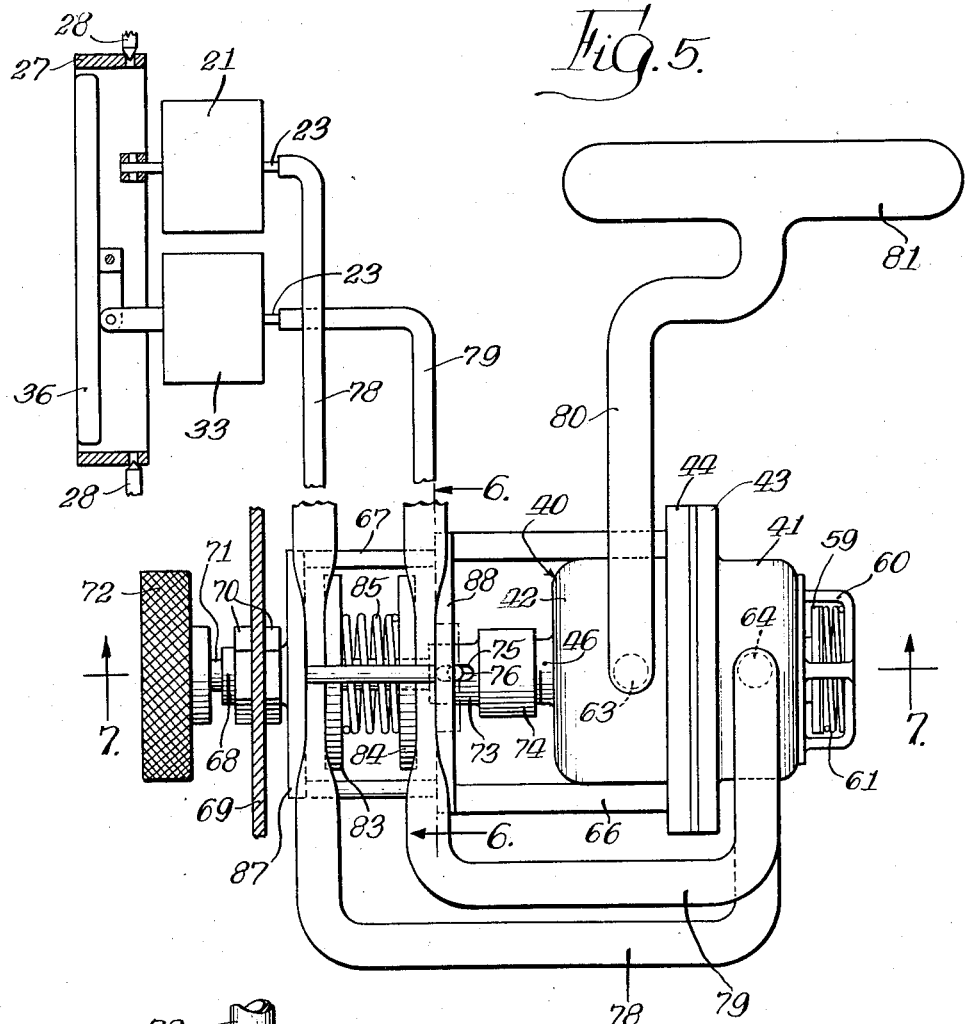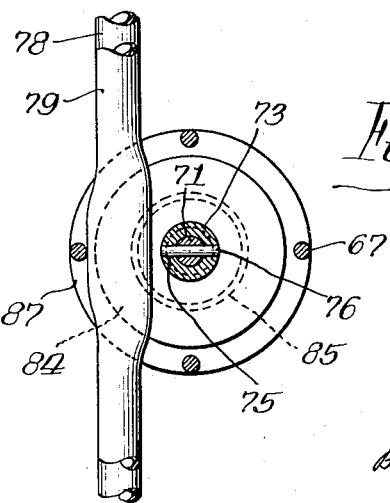

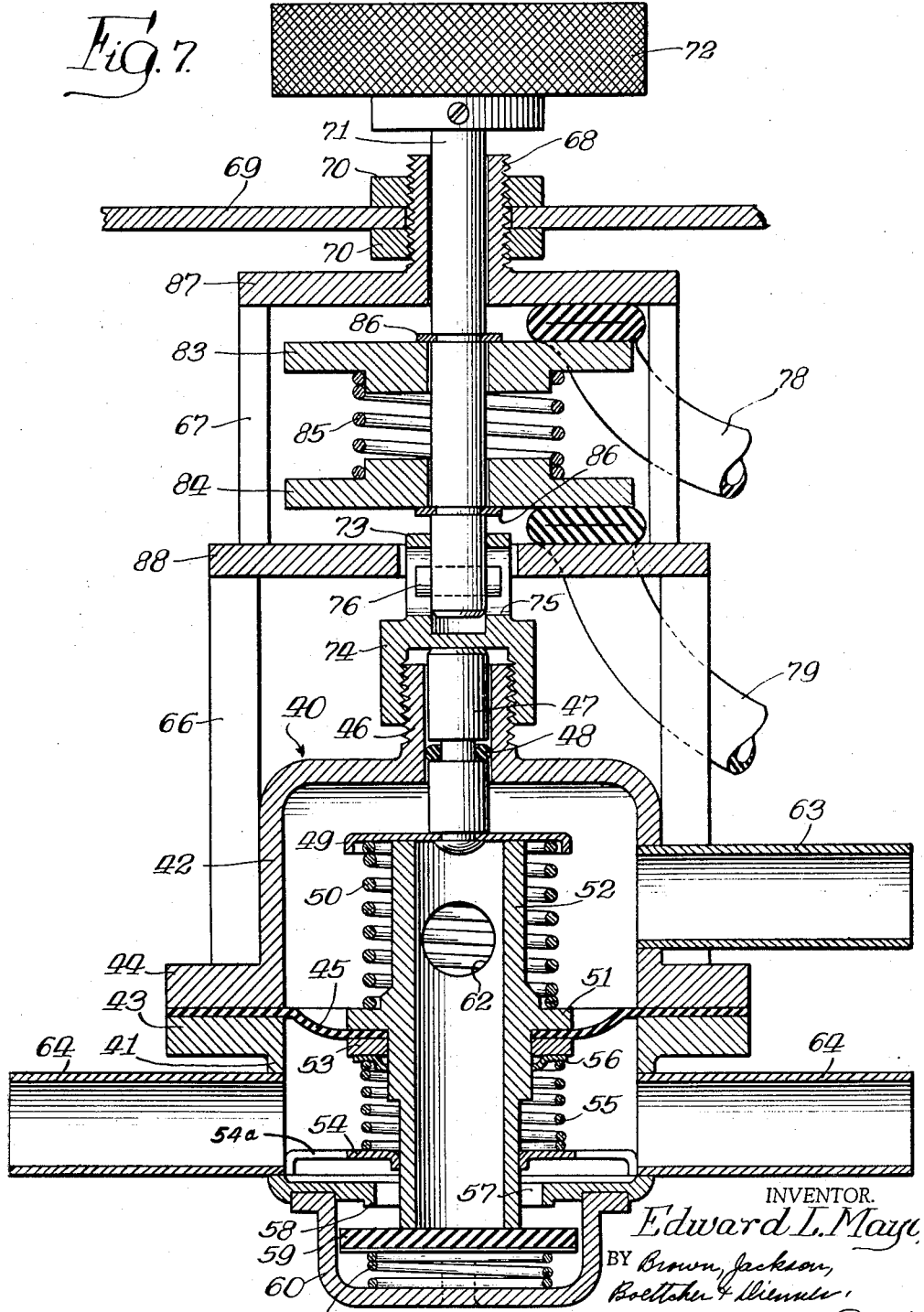

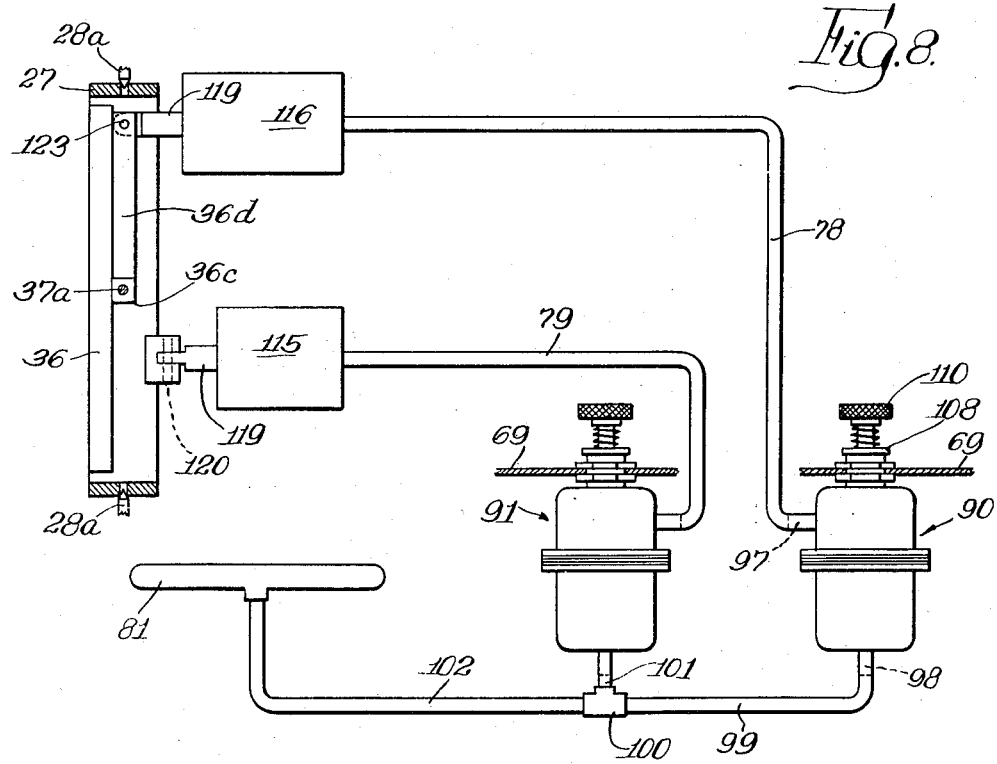
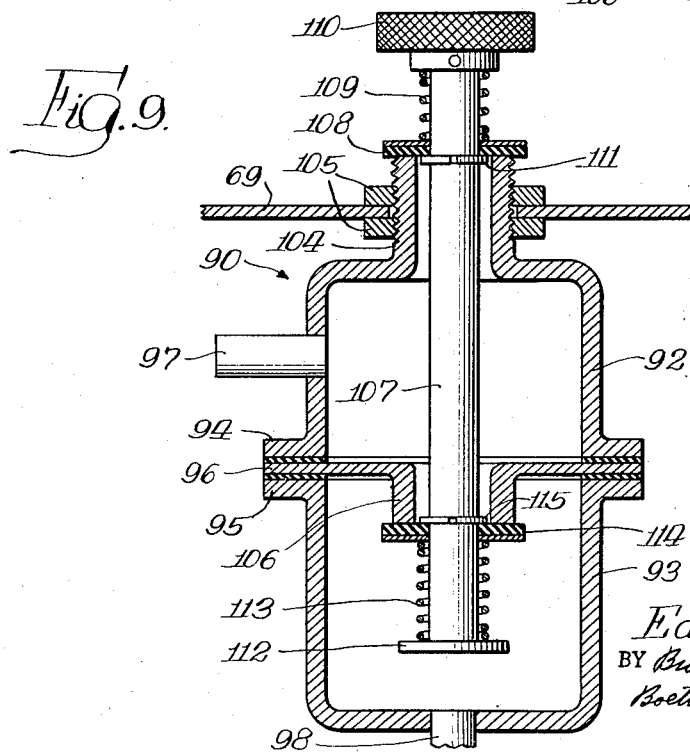

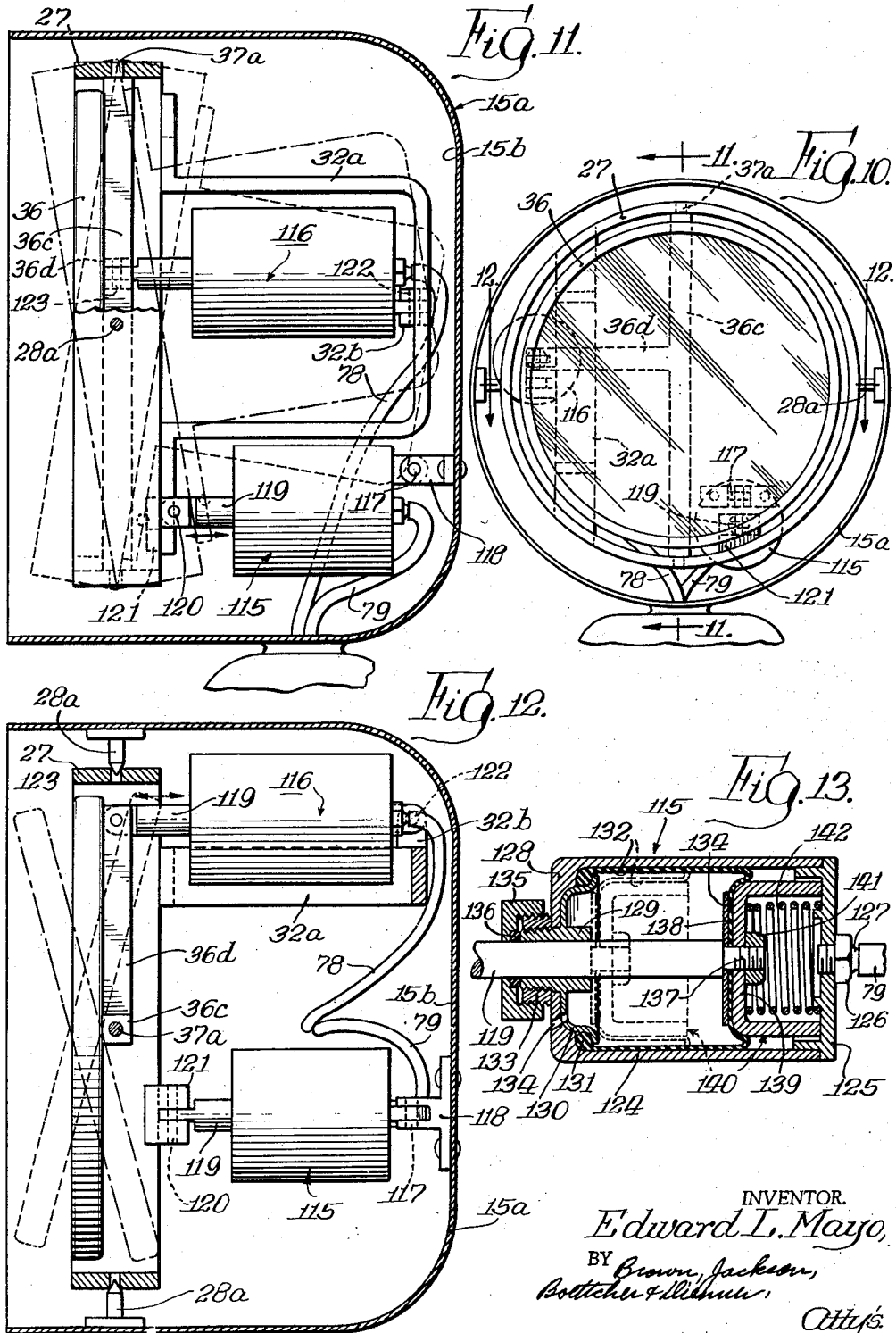

2,906,098

REMOTELY CONTROLLED REAR VIEW MIRROR

Edward L. Mayo, Cleveland, Ohio, assignor to The Bishop and Babcock Manufacturing Company, Cleveland, Ohio, a corporation of Ohio Application November 26, 1957, Serial No. 699,096

5 Claims. (Cl. 60—97)

This invention relates to remotely controlled means for effecting desired adjustment of automotive rear view mirrors and analogous devices.

Rear view mirrors for automotive vehicles are well known and extensively used. It is frequently desirable to change the setting of such a mirror to assure better vision of traffic approaching from the rear. In many cases the mirror is mounted at the exterior of the vehicle and is not readily accessible to the driver, and may, in some instances, be spaced a considerable distance from the driver by being mounted on a support or arm of substantial length. Adjustment of an exterior rear view mirror by hand often may be difficult and if attempted while driving may be dangerous in respect to possible collision.

My invention is directed to means for effecting desired adjustment of rear view mirrors, particularly mirrors disposed exteriorly of automotive vehicles, by an adjustment control mounted on the instrument panel or in any suitable location readily accessible to the driver when seated. To that end I provide simple and efficient means whereby desired adjustment of the mirror may be effected by suction derived from a suitable source, conveniently the intake manifold of the engine of the vehicle, under control of valve means readily accessible to the driver. The means for adjusting the mirror also assures that it will be held in the desired adjustment and enables adjustment in small increments both vertically and horizontally throughout the required range of adjustment. While my invention is particularly suitable for adjusting rear view mirrors, in certain respects, it is suitable, in its broader aspects, for adjusting various devices. It will be understood, therefore, that in the following disclosure my invention is shown as used for adjusting a mirror by way of example only and not by way of limitation. Further objects and advantages of my invention will appear from the detail description.

In the drawings:

Figure 1 is a front view of a housing and a mirror mounted therein embodying my invention;

Figure 2 is a sectional view, on an enlarged scale, taken substantially on line 2—2 of Figure 1, certain parts being shown in elevation;

Figure 3 is a sectional view, on an enlarged scale, taken substantially on line 3—3 of Figure 1, certain parts being shown in elevation;

Figure 4 is a sectional view, on an enlarged scale, taken substantially on line 4—4 of Figure 2, certain parts being shown in elevation;

Figure 5 is a diagrammatic view of the mirror and mounting and adjusting means therefor, embodying my invention;

Figure 6 is a sectional view taken substantially on line 6—6 of Figure 5;

Figure 7 is an axial sectional view, on an enlarged scale, taken substantially on line 7—7 of Figure 5, certain parts being shown in elevation.

Figure 8 is a diagrammatic view similar to Figure 5 but of a modified form of my invention;

Figure 9 is an axial section, on an enlarged scale, of one of the adjusting valves of the diagram of Figure 8, certain parts being shown in elevation;

Figure 10 is a view similar to Figure 1 but showing the mirror adjusting means of Figure 8;

Figure 11 is a sectional view, on an enlarged scale, taken substantially on line 11—11 of Figure 10, certain parts being shown in elevation;

Figure 12 is a sectional view, on an enlarged scale, taken substantially on line 12—12 of Figure 10, certain parts being shown in elevation; and Figure 13 is an axial sectional view, on an enlarged scale, of one of the mirror adjusting motors of the modified form of adjusting means of Figures 8 to 11, inclusive, certain parts being shown in elevation.

The mirror and associated parts are mounted in a suitable housing 15 joined by a tubular neck 16 to a base 17 which may be mounted on a suitable support or arm exteriorly of the automotive vehicle with the mirror directed rearward. A mounting plate 18 is suitably secured within housing 15 adjacent the front thereof. Plate 18 is provided with a suitable opening which receives a threaded nipple 19 secured to and opening through the forward end or head 20 of a corrugated metal bellows 21 of known type. The nipple 19 is shouldered, as shown, and receives a securing nut 22 threaded thereon and seating against the forward face of plate 18 and cooperating with the shoulder of nipple 19 to secure bellows 21 tightly to plate 18. Nipple 19 receives a nipple 23 of reduced diameter secured therein for a purpose to be explained presently. At its other or rearward end the bellows 21 is closed by a head 24 to the center of which is secured a rearwardly projecting flat finger 25 pivoted at 26 to the radially inner end of an arm 26a fixed to an outer ring 27 which is pivoted, by means of pointed screws 28, in housing 15 for free turning movement about a diametrical vertical axis. A compression spring 29 is disposed within the bellows 21 and confined between heads 20 and 24 thereof, spring 29 urging the bellows in expanding direction. Expansion of the bellows turns ring 27 in one direction about its pivot axis and contraction of the bellows 21 turns ring 27 about its axis in the opposite direction, as will be understood from what has been said. The bellows 21 possesses appreciable flexibility such that it readily bends to accommodate the turning movements of ring 27, which are limited in extent and ordinarily need not exceed approximately 30° from one extreme position to the other.

A bracket is suitably secured, conveniently by welding, to the rearward end of ring 27 and has mounted thereon a bellows 33 similar to the bellows 21 and mounted on bracket 32 in the same manner in which bellows 21 is mounted on plate 18. The bellows 33 has a flat finger 34 secured to the center of its rearward end or head and pivoted at 35 to arm 36a of a horizontal cross bar 36b secured to the front of an inner ring or frame 36 diametrically thereof, ring 36 being concentric with ring 27 and pivotally mounted therein by means of pointed pivot pins 37 entering the ends of bar 36b. The inner ring 36 is thus pivotally mounted in the outer ring 27 on a diametrical horizontal axis and the pivot 35 is parallel with that axis and disposed a short distance there below so that expansion and contraction of bellows 33 a short distance in either direction is effective for turning the ring 36 a substantial distance about its pivot axis. The pivot connection 26 between finger 25 of bellows 21 and ring 27 is parallel with the vertical pivot axis of that ring and is disposed to one side of such axis to assure turning of ring 27 by the bellows 21 in the manner above described. The inner ring 36 has mounted therein the mirror 38. It will be understood, from what has been said, that the mirror is mounted in gimbals so as to be turnable about both a vertical axis and a horizontal axis, and that turning of the mirror to desired extent about either axis and in desired direction may be effected by means of the bellows 21 and 33.

Actuation of the bellows 21 and 33 is controlled by a control valve and pinch valve assembly shown more clearly in Figures 5, 6 and 7. Referring to Figure 7, the control valve 40 comprises a casing formed in two substantially cylindrical sections 41 and 42 having outwardly extending circumferential base flanges 43 and 44, respectively, bolted together and clamping between them the outer marginal portion of a flexible diaphragm 45 of suitable material. The casing section 42 is provided at its upper end with an exteriorly threaded neck 46 which slidably receives a plunger 47 having a circumferential groove receiving an O sealing ring 48 providing an air tight seal about plunger 47. A cup 49, secured to the inner end of plunger 47, receives the upper end of a compression spring 50 the lower end of which seats on an outer circumferential flange 51 of a tubular vacuum control valve member 52 disposed within spring 50 and also seating at its upper end in cup 49. The inner marginal portion of diaphragm 45 is clamped between flange 51 and a clamp ring 53 disposed at about the mid-length of valve member 52 and secured thereto in a suitable manner, as by having a drive fit thereon. The lower portion of valve member 52 is slidable through a guide 54 secured in the lower portion of casing section 41 in a suitable manner, as by having a drive fit therein. A compression spring 55, lighter than spring 50, is disposed about valve member 52 and confined between guide 54 and a seat member 56 seating on ring 53. Casing section 41 is provided at its lower end with an air inlet port 57 concentric with, and of somewhat greater diameter than, valve member 52, and a valve seat element 58. The lower end of valve member 52 is accurately formed to provide a seat for an air intake disc valve member 59, formed of rubber or any suitable material, operable in an open valve cage 60 suitably secured, conveniently by welding, to the bottom of casing section 41. A compression spring 61, confined between the bottom of valve cage 60 and disc valve 59, yieldingly urges the latter toward valve member 52 normally holding it seated thereon. When the vacuum control valve member 52 is in its position shown in Figure 7, disc valve member 59 is spaced from its seat element 58 admitting air, through port 57 and openings 54a in guide 54, to the air inlet chamber defined by section 41 of the housing of control valve 40. The vacuum control valve member 52 is provided with an opening 62 to the interior of the suction chamber defined by section 42 of the control valve housing or casing, which section 42 has a nipple 63 opening into it. Section 41 of the control valve housing, defining the air inlet chamber, is provided with two nipples 64 opening into it.

An open supporting frame 66 is suitably secured to the housing of control valve 40, conveniently by being bolted to the flanges thereof, and extends upward therealong. An open guide frame 67 is secured to frame 66 and extends thereabove, the frames 66 and 67 being concentric with the control valve 40. Frame 67 is provided with an exteriorly threaded tubular neck 68 extending from its upper end through an opening in instrument panel 69 of the automotive vehicle and secured thereto by clamp nuts 70 threaded on neck 68 at opposite faces of panel 69. An operating rod or stem 71 is slidably and rotatably mounted in neck 68 and is provided at its upper end, as shown in Figure 6—its rearward end as applied to the automotive vehicle—with a grip member or knob 72 suitably secured thereon. The lower or forward end portion of stem 71 extends into an extension 73 of a cap 74 threaded onto neck 46. Extension 73 of cap 74 is provided with aligned lengthwise slots 75 which receive the end portions of a pin 76 secured through stem 71 diametrically thereof. That provides a pin and slot connection between stem 71 and cap 74 such that stem 71 may be moved axially independently of cap 74 and by rotating stem 71 cap 74 may be threaded onto and off of the neck 46 of the housing of the control valve 40. The plunger 47 is held in pressure contact with the rearward end or top of cap 74 and may be adjusted lengthwise by threading cap 74 onto and off of neck 46. When cap 74 is threaded to maximum extent onto the neck 46 plunger 47 is in its fully depressed or retracted position effective for holding the valve member 52 depressed and seated on the disc valve 59 with the latter in its full open position, as shown in Figure 7. The air inlet chamber of control valve 40 is then fully opened to atmosphere and is closed to the suction chamber, being thereby closed to the source of suction, as will appear more fully presently. By threading the cap 74 off of the neck 46 to proper extent, outward movement of plunger 47 to its projected position is permitted, with corresponding movement of the valve member 52 and the disc valve 59, under the influence of springs 55 and 61, with resultant closing of disc valve 59 on its seat element 58 followed by movement of valve member 52 away from disc valve 59. Movement of valve member 52 away from the disc valve 59 establishes communication between the suction chamber and the air inlet chamber of the control valve 40 thereby connecting the latter chamber to suction.

Referring to Figures 5 and 6, the nipple 23 of bellows 21 is connected by a compressible tube or conduit 78, formed of rubber or any suitable material, to one of the nipples 64 opening into the air inlet chamber of the control valve 40. The nipple 23 of the other bellows 33 is connected by a tube or conduit 79, similar to conduit 78, to the other nipple 64 opening into the air inlet chamber defined by section 41 of the housing or casing of the control valve 40. Nipple 63, opening into the suction compartment or chamber of the control valve 40, is connected by a conduit 80 to a suitable source of suction, conveniently the intake manifold 81 of the automotive vehicle.

Two discs 83 and 84 of shouldered formation are mounted on stem 71 free therefrom within the frame 67. The discs 83 and 84 are urged away from each other by a compression spring 85 confined therebetween and seating at its ends about the opposed cylindrical shoulders of the discs. Movement of the discs 83 and 84 away from each other is limited by C snap rings 86 engaging in circumferential grooves in the stem 71. The conduit 78 is led through frame 67 between disc 83 and head 87 at the upper or rearward end of frame 67. Likewise the conduit 79 is led through frame 67 between disc 84 and an annular flange 88 at the upper or rearward end of the supporting frame 66, flange 88 being of substantial width. The snap rings 86 provide abutment members so spaced axially of stem 71 that the discs 83 and 84 normally are held by compression spring 85 in pressure contact with the conduits 78 and 79 clamping them between disc 83 and head 87 and disc 84 and flange 88, respectively, effective for pinching the conduits 78 and 79 together and effectively closing them. As will be understood, the discs 83 and 84 and associated parts provide pinch valve means for normally closing the conduits 78 and 79. Such pinch valve means also restrains the stem 71 against any objectionable axial looseness or play. The forward or inner end of stem 71 normally is spaced away from cap 74 a sufficient distance such that the stem may be moved axially in either direction independently of cap 74 for releasing or opening either of the conduits 78 or 79, selectively. Movement of stem 71 toward cap 74 is effective for moving the clamp disc 83 away from conduit 78 thereby releasing the latter which, due to its inherent resiliency, opens for establishing communication between the bellows 21 and the air inlet compartment of control valve 40. In like manner axial movement of stem 71 away from cap 74 releases the conduit 79 thereby establishing communication between bellows 33 and the air inlet chamber of control valve 40. In that manner the bellows 21 and 33 may be selectively connected to the air inlet chamber of control valve 40 without affecting the adjustment of the latter. Also, the discs 83 and 84 being free from stem 71, the latter may be rotated in either direction for adjusting the control valve 40 without opening either of the conduits 78 or 79.

It may be assumed, for purposes of description, that the mirror 38 normally is disposed vertically in a plane perpendicular to the lengthwise axis of the automotive vehicle, with the gimbal rings 27 and 36 parallel with the mirror and with each other. Under such conditions the bellows 21 and 33 are under partial vacuum or suction trapped therein by closing of the conduits 78 and 79, to counteract to a certain extent the expansive force of the compression spring 29 in the respective bellows so as to maintain the mirror in the position stated. The mirror is then effectively held in adjustment and the compression springs 29, in conjunction with the inherent resiliency of the bellows 21 and 33, damp out any objectionable vibration of the mirror. If it is desired to turn the mirror in clockwise direction about its diametrical horizontal axis and the air inlet chamber of the control valve is open to atmosphere as shown in Figure 7, the stem 71 is pulled outward away from cap 74 so as to permit slight opening of the conduit 79 with resultant bleeding of air into the bellows 33. In that manner the partial vacuum within that bellows may be gradually reduced permitting expansion of the bellows by its contained compression spring 29 with resultant turning of ring 36 from its full line position shown in Figure 2 to its dotted line position there shown, it being noted that the pivot connection 35 between ring 36 and finger 34 of bellows 33 is a short distance below the diametrical horizontal pivot axis of ring 36. When the desired adjustment of the mirror has been effected knob 72 is released and stem 71 is returned to its normal position thereby again closing the conduit 79 and the mirror is then held in adjustment as before. If it is desired to adjust the mirror in counterclockwise direction about the vertical pivot axis of ring 27, the stem 71 is pushed toward cap 74 so as to open conduit 78 and bleed air into the bellows 21 until the desired adjustment has been effected, at which time it may be assumed that the ring 27 is in its dotted line position indicated in Figure 3, ring 36 and with it the mirror 38 having been turned through the same angle as the ring 27. The knob 72 is then released and the stem 71 is returned to its normal position, after which the ring 27 and the mirror are held in the adjusted position indicated. It will be noted that in effecting the two adjustments just referred to the stem 71 is moved axially without movement of the cap 74 so that the inlet compartment or chamber defined by section 41 of the housing of the control valve 40 remains open to atmosphere as shown in Figure 7.

In order to tilt ring 36 in counterclockwise direction to its position indicated by dot and dash lines in Figure 2, the bellows 33 is connected to suction so as to be contracted to the proper extent. To that end, stem 71 is rotated by means of knob 72 in such direction as to thread cap 74 off of neck 46 to such an extent as to close the disc valve 59 and then move the valve member 52 away from disc valve 59 thereby establishing communication between the suction chamber of the control valve 40 and the air inlet chamber thereof, the latter chamber being then closed to atmosphere and open to suction. The stem 71 is then pulled outward or rearward so as to release the pressure on conduit 79 thereby connecting bellows 33 to suction until it has been contracted sufficiently to tilt the mirror to its dot dash line position indicated, at which time knob 72 is released and stem 71 is returned to its normal position thereby again closing the conduit 79 to suction, the mirror then being held in adjustment in the manner above described. With the inlet chamber of the control valve closed to atmosphere and opened to suction, as above, the ring 27 may be turned to its dot dash line position indicated in Figure 3, carrying with it ring 36 and mirror 38, by pushing the stem 71 inward thereby releasing the conduit 78 and connecting bellows 21 to suction until it has been contracted sufficiently to effect the desired adjustment. Knob 72 is then released from pressure and the stem 71 is returned to its normal position thereby again closing the conduit 78 to suction, ring 27 being then held in adjusted position in the manner previously described. If it is desired to move either the ring 27 or the ring 36 from the position to which it has been adjusted by contraction of the corresponding bellows, air is bled to the appropriate bellows. In order to accomplish that, stem 32 is rotated by means of knob 72 in proper direction to thread the cap 74 onto neck 46 sufficiently to close the air inlet chamber of the control valve 40 to suction and open it to atmosphere, as shown in Figure 7. Thereafter by moving the stem 71 axially in proper direction to release the appropriate one of the conduits 78 and 79 air may be bled into the corresponding bellows until the corresponding ring has been turned to the desired extension by expansion of the bellows under the influence of the compression spring 29 therein, as previously described. In that connection, it will be understood that the control valve 40, as shown in Figure 7, is considerably enlarged for clearness of illustration. In practice that valve is much smaller than shown and the extent of movement of the parts to accomplish the desired adjustments of the mirror is considerably less than would appear from Figure 7, so that such adjustments may be accomplished quickly and accurately.

In the modified form of my invention shown in Figures 8 to 13, inclusive, conduits 78 and 79 are connected to the air inlet chambers of adjusting valves 90 and 91, respectively. The valves 90 and 91 are of the same construction and operation and a description of one thereof will suffice. Referring to Figure 9, the valve 90, for example, comprises a suitable housing formed in two semi-cylindrical sections 92 and 93 having outer circumferential base flanges 94 and 95 between which is disposed a plate 96 with sealing gaskets interposed between the latter and the flanges 94 and 95 which are secured together by bolting or in any suitable manner. The plate 96 separates the housing of valve 90 into an upper air inlet compartment and a lower suction compartment or chamber, the upper section of the housing having a nipple 97 opening thereinto to which is attached the conduit 78. The lower section 93 of the housing is provided with a nipple 98 opening centrally through its lower end and receiving the conduit 99 connected to a T fitting 100 which is connected by a short conduit 101 to a nipple opening into the lower suction compartment or chamber of the valve 91, T 100 being connected by a conduit 102 to the source of suction, such as the intake manifold 81.

The upper section 92 of the housing of adjusting valve 90 is provided with an exteriorly threaded neck 104 secured through the instrument panel 69 by nuts 105 threaded thereon at opposite faces of the panel. Neck 104 is aligned with a neck 106 extending downward from the center of the partition plate 96 and a stem 107 of appreciably less diameter than the necks 104 and 106 extends therethrough and projects beyond neck 104. The upper end of neck 104 is accurately machined to provide a seat for a disc valve 108 formed of suitable material, such as rubber, urged toward neck 104 by a compression spring 109 disposed about stem 107 and confined between valve 108 and a suitable knob or head 110 secured on the upper or rearward end of stem 107. A snap ring 111 of known type engages in a circumferential groove in stem 107 at the lower or rearward face of valve 108 and limits movement thereof away from the knob or head 110. At its lower or rearward end the stem 107 is provided with an abutment member or disc 112 secured thereto against which seats one end of a compression spring 113 disposed about the lower or forward end portion of stem 107. Spring 113 is confined between disc 112 and a disc valve 114 similar to valve 108, movement of which away from disc 112 is limited by a snap ring 115 engaging in a groove in stem 107. The lower end of neck 106 of the partition plate 96 is accurately machined to provide a valve seat cooperating with the valve member 114. Normally the disc valve members 108 and 114 are held in their seated or closed positions, as shown in Figure 9, so that the air inlet compartment or chamber of the valve 90 is closed to atmosphere and is also closed to the suction compartment or chamber of that valve. In practice the two adjusting valves 90 and 91 are mounted on the instrument panel 69 in proximity to each other and in a position readily accessible to the driver of the automotive vehicle.

Referring to Figures 10, 11 and 12, the outer ring 27 is pivoted on a horizontal diametrical axis by pivot pins 28a secured in housing 15a and the inner ring 36 is pivoted on a vertical diametrical axis by pivot pins 37a secured in the ends of a vertical cross bar 36c secured to the front of ring 36. The rings 27 and 36 are adjusted by means of two suction operated motors 115 and 116, respectively, to be described in detail presently. The forward end of motor 115 is pivoted at 117, on a horizontal axis, to a slotted bracket 118 secured to the forward wall 115b of housing 15a. The rearward end of plunger 119 of motor 115 is pivoted at 120, on a horizontal axis, to a bracket 121 secured to the outer ring 27 adjacent the bottom thereof a short distance from bar 36c. The forward end of motor 116 is pivoted at 122, on a vertical axis, in a slotted finger 32b of a bracket 32a secured to the rear of ring 27 adjacent the side thereof remote from motor 115. The forward end of plunger 119 of motor 116 is pivoted at 123, on a vertical axis, in the slotted radially outer end of an arm 36d extending from bar 36c a short distance above the horizontal pivot axis of ring 27.

The motors 115 and 116 are of the same construction and operation, and a description of one thereof will suffice. In Figure 13 the motor 115, for example, comprises a cylinder 124 closed at its forward end by a head 125. A shouldered fitting 126, providing a nipple 127, is screwed into head 125 centrally thereof, nipple 127 receiving the end of conduit 79. The other or rearward end of cylinder 124 is closed by an integral head 128 having a central opening through which extends a tubular fitting 129 having a circumferential flange 130 the peripheral portion of which is suitably formed to receive a peripheral bead 131 at the rearward end of a seal member 132 formed of suitable material such as rubber. An exteriorly threaded ring 133 is screwed onto the projecting portion of fitting 129 and seats on the outer face of head 128, securing fitting 129 tightly in position and clamping bead 131 of seal member 132 tightly between the peripheral portion of flange 130 and the corresponding area of the inner face of head 128. The latter and flange 130 are provided with aligned openings providing a vent port 134 to atmosphere.

The seal member 132 is in the form of a bag open at its rearward end and closed at its forward end by an end wall 134. The plunger 119 is slidably mounted through fitting 129 and is pivoted at its rearward end to ring 27, as above explained. A nut 135 is threaded on ring 133 and is provided with an interior recess receiving an O ring 136 of suitable material, such as rubber, which fits closely about plunger 119. The ring 136 provides friction means resisting endwise movement of plunger 119, the effectiveness of which may be varied to suit requirements, for a purpose to be explained presently, by adjustment of nut 135. The arrangement is, in general, similar to a stuffing box, but for a different purpose.

The plunger 119 is provided at its forward end with a reduced and threaded stud 137 which extends through a clamp disc 138, end wall 134 of member 132, and head 139 of a cup shaped piston 140 mounted in cylinder 124. A nut 141, threaded on the forward end of stud 137 and seating on piston head 139 clamps end wall 134 of seal member 132 tightly between disc 138 and head 139. As will be understood from what has been said, the seal member 132 effectively seals off the space within cylinder 124, between head 125 thereof and end wall 134 of member 132, from the atmosphere while accommodating movement of piston 140 lengthwise of cylinder 124. A compression spring 142, confined between cylinder head 125 and head 139 of piston 140, urges the latter toward head 128. When the space between piston 140 and head 125 is connected to atmosphere, compression spring 142 holds piston 140 in approximately its broken line position indicated in Figure 13.

As will be understood from what has been said, each of the motors 115 and 116 is connected to the manifold or source of suction by a conduit in which is interposed an adjusting valve such as the valve 90 illustrated in Figure 9. By moving the stem 107 of the adjusting valve inwardly or rearwardly the valve member 114 thereof is moved away from the neck 106 of plate 96 thereby establishing communication between the suction chamber of the adjusting valve and the air intake chamber thereof, the latter being maintained closed to atmosphere so that the corresponding motor is connected to suction for effecting the desired adjustment. By moving the stem 107 outward the disc valve member 108 is moved away from the end of neck 104 thereby opening the air intake chamber or compartment of the valve to atmosphere while maintaining the disc valve member 114 seated on neck 106 of plate 96 and thereby maintaining the air intake chamber of the adjusting valve closed to suction. In that manner air may be bled to the corresponding motor for moving the mirror in desired direction. It will be apparent, from what has been said, that by proper manipulation of the adjusting valves 90 and 91 the mirror may be quickly and accurately adjusted in any direction about the vertical and the horizontal axes of the gimbal rings and to any desired extent, within limits, and is effectively held in adjusted position. In practice the adjusting valves 90 and 91 are of approximately the size illustrated in Figure 8, the showing of the valve 90 in Figure 9 being on a considerably enlarged scale for clearness of illustration, as will be understood.

The O ring 136, previously referred to, provides friction means resisting free endwise movement of plunger 119 and is effective for damping out any vibration of the mirror in any adjusted position thereof. That assures that the mirror will be held steady and will give a clear view to the rear of the vehicle. The motors 115 and 116, being pivotally mounted, accommodate adjustment of the mirror both vertically and horizontally without binding of parts, conducive to ease and accuracy in effecting desired adjustments. It will be noted that in the modified form of Figures 8 to 13, inclusive, the outer ring 27 is adjustable about a horizontal axis and the inner ring 36 is adjustable about a vertical axis. That arrangement accommodates substantial adjustment of the mirror horizontally, from side to side, which is desirable, such adjustment often being greater than the required vertical, from front to back, adjustment. In either case I provide means whereby the mirror may readily be adjusted from the instrument panel, in either direction and to any desired extent, within limits. As will be understood from the above, within the broader aspects of my invention, any suitable means may be provided for adjusting the gimbal rings, though the adjusting means disclosed herein is preferred and possesses certain advantages above described. In the modified form of Figures 8 to 13, inclusive, the motors 115 and 116, like the metal bellows 21 and 33 of the form shown in Figures 1 to 7, inclusive, constitute expansible and contractible operating members respectively connected to the gimbal rings and yieldingly urged in expanding direction.

It will be understood that changes in detail may be resorted to without departing from the field and scope of my invention, and I intend to include all such variations, as fall within the scope of the appended claims, in this application in which the preferred forms only of my invention have been disclosed.

I claim:

1. In adjusting means of the character described, a housing, a first ring mounted in said housing for adjustment about a first axis, a second ring mounted in said first ring for adjustment about a second axis perpendicular to said first axis, said rings being otherwise restrained against movement, a member to be adjusted mounted in said second ring and restrained against movement relative thereto, an arm fixed to said first ring extending inwardly thereof and disposed substantially parallel with and to one side of said second axis, a first suction operated motor mounted in said housing comprising a part yieldingly urged toward said member and movable by suction in a direction away from said member, said part being pivoted to said arm on an axis parallel with and spaced from said first axis and being effective for adjusting said first ring about said first axis and holding it fixed in adjusted position, a second suction operated motor mounted in said housing comprising a part yieldingly urged toward said member and movable by suction in a direction away from said member, said second motor part being pivoted to said second ring on an axis parallel with and spaced from said second axis and being effective for adjusting said second ring about said second axis and holding it fixed in adjusted position, a suction source, and means for selectively and independently connecting said motors to suction and to atmosphere to variable extent.

2. In a device of the character described, a first ring mounted for adjustment about a diametrical axis, a second ring mounted in said first ring for adjustment relative thereto about a diametrical axis perpendicular to said axis of said first ring, a member to be adjusted carried by said second ring, a source of suction, a first operating bellows anchored at one end yieldingly urged in expanding direction toward said first ring and attached thereto at its other end for adjusting said first ring about its said axis, a second operating bellows anchored at one end yieldingly urged in expanding direction toward said second ring and attached thereto at its other end for adjusting said second ring about its said axis, a control valve having a first chamber connected to suction and a second chamber, conduits respectively connecting said bellows to said second chamber, pinch valve means normally closing said conduits, and common operating means for said control valve and said pinch valve means comprising means for optionally opening said second chamber to atmosphere and closing it to atmosphere and opening it to said first chamber and means for selectively opening said conduits.

3. In a device of the character described, a first ring mounted for adjustment about a diametrical axis, a second ring mounted in said first ring for adjustment relative thereto about a diametrical axis perpendicular to said axis of said first ring, a member to be adjusted carried by said second ring, a source of suction, a first operating bellows anchored at one end yieldingly urged in expanding direction toward said first ring and attached thereto at its other end for adjusting said first ring about its said axis, a second operating bellows anchored at one end yieldingly urged in expanding direction toward said second ring and attached thereto at its other end for adjusting said second ring about its said axis, a control valve comprising a housing having a first suction chamber connected to suction and a second air inlet chamber, said housing having a threaded neck extending from the suction chamber end thereof, a plunger slidable in said neck, means for opening said air inlet chamber to atmosphere and closing it to said suction chamber and closing said air inlet chamber to atmosphere and opening it to said suction chamber responsive to inward and outward movement respectively of said plunger, a cap threaded on said neck contacting said plunger for adjusting it in either direction, a rotatably and slidably mounted adjusting stem having lost motion connection to said cap for rotating it in either direction and axially movable independently of said cap, and valve means carried by said stem normally closing said conduits and axially movable with said stem for selectively opening said conduits.

4. In a device of the character described, a first ring mounted for adjustment about a diametrical axis, a second ring mounted in said first ring for adjustment relative thereto about a diametrical axis perpendicular to said axis of said first ring, a member to be adjusted carried by said second ring, a source of suction, a first suction operated motor attached to said first ring effective for adjusting it about said first axis and holding it in adjustment, a second suction operated motor attached to said second ring effective for adjusting the latter about said second axis and holding it in adjustment, control valve means comprising a first chamber connected to suction and a second chamber, conduits respectively connecting said motors to said second chamber, valve means individual to and normally closing said conduits, and means for operating said control valve means and said conduit valve means comprising a common operating member adjustable for optionally opening said second chamber to atmosphere and closing it to atmosphere and opening it to said first chamber to variable extent and for selectively opening said conduit valve means.

5. In a device of the character described, a first ring mounted for adjustment about a diametrical axis, a second ring mounted in said first ring for adjustment relative thereto about a diametrical axis perpendicular to said axis of said first ring, a member to be adjusted carried by said second ring, a source of suction, a first suction operated motor attached to said first ring effective for adjusting it about said first axis and holding it in adjustment, a second suction operated motor attached to said second ring effective for adjusting the latter about said second axis and holding it in adjustment, control valve means comprising a first chamber connected to suction and a second chamber, conduits respectively connecting said motors to said second chamber, valve means individual to and normally closing said conduits, and means for operating said control valve means and said conduit valve means comprising an operating rod mounted for rotation and endwise movement in either direction, said rod having operating connection to said control valve means and to said conduit valve means effective for optionally opening said second chamber to atmosphere and closing it to atmosphere and opening it to said first chamber to variable extent responsive to turning of said rod and for selectively opening said conduit valve means responsive to endwise movement of said rod.

References Cited in the file of this patent

UNITED STATES PATENTS

| | | |
|---|---|---|
| 840,193 | Barlow | Jan. 1, 1907 |
| 1,389,816 | Day et al. | Sept. 6, 1921 |
| 1,398,291 | Arbuckle | Nov. 29, 1921 |
| 2,368,628 | Bates | Feb. 6, 1945 |
| 2,656,764 | Johnson | Oct. 27, 1953 |